FIG. 24
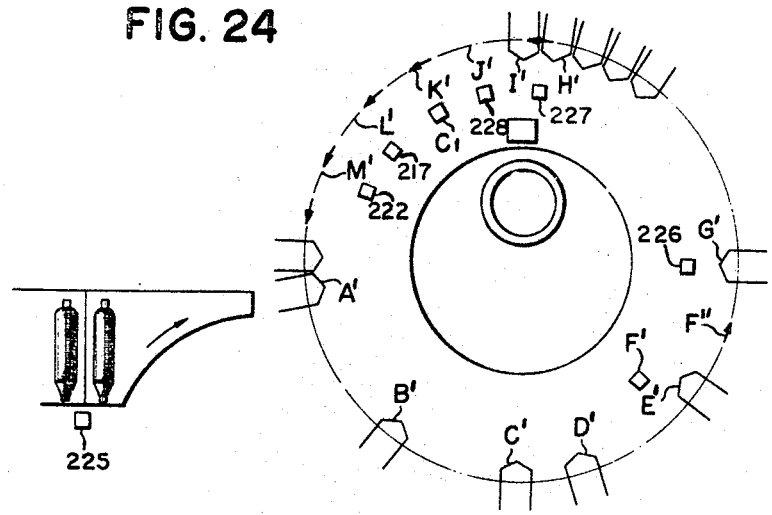
FIG. 25A
FIG. 25B
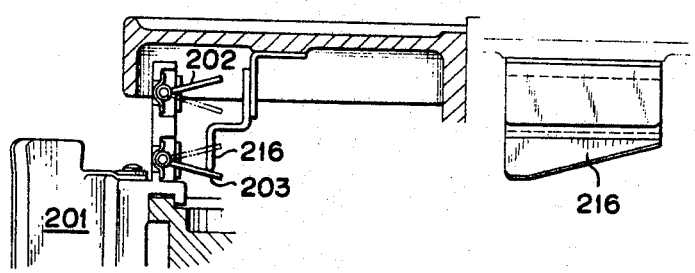
FIG. 26A
FIG. 26B
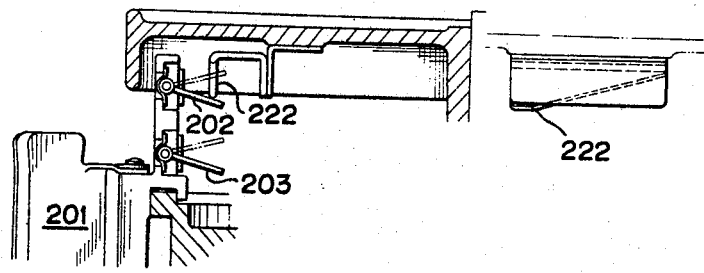

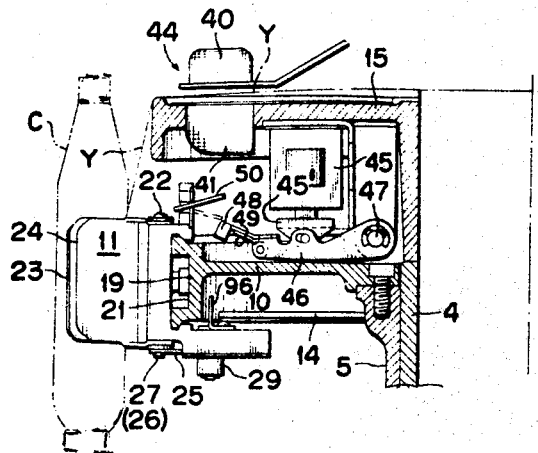
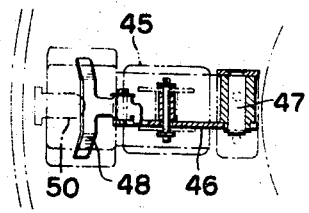
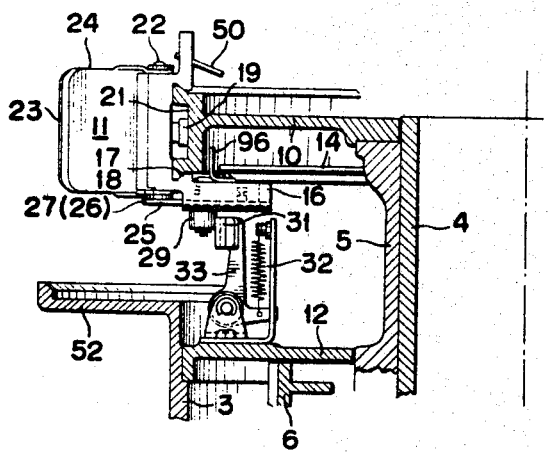
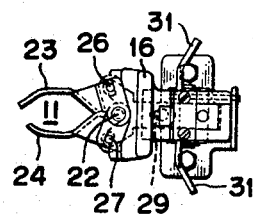

United States Patent Office 3,480,215
Patented Nov. 25, 1969

3,480,215
AUTOMATIC COP SUPPLYING METHOD AND
ITS APPARATUS OF AUTOMATIC WINDING
MACHINE
Isamu Matsui and Tamotsu Miyagi, Kyoto-shi, and
Muneaki Funahashi, Kyoto-fu, Japan, assignors to
Murata Machinery, Ltd., Kyoto-shi, Kyoto, Japan,
and Toyo Boseki Kabushiki Kaisha, Osaka, Japan,
both companies of Japan
Filed Oct. 25, 1966, Ser. No. 589,263
Claims priority, application Japan, Oct. 26, 1965,
40/65,796; Nov. 27, 1965, 40/72,791; Apr. 8,
1966, 41/22,328
Int. Cl. B65h 54/24
U.S. Cl. 242—35.5       19 Claims

ABSTRACT OF THE DISCLOSURE

A method of automatically supplying fresh cops to travelling winding units of an automatic winder. The fresh cops to be supplied have a tail free end retrieved of the yarn thereof as the cops are transported to a supply position. The retrieving of the free end of the yarn is detected and if a failure to retrieve the free tail end of the yarn has taken place on individual cops, these cops are automiatcally discharged from the cop-supply line as "failed" cops and only "normal" cops in which retrieval of the free tail end of the yarn has taken place are supplied to the winder.

---

Other features and advantages of the present invention will be apparent from the ensuing description with reference to the accompanying drawings and appended claims to which the scope of the invention is in no way limited.

FIGS. 14 and 15 are a side view and a plan view respectively illustrating the relation between a finger and cam for shifting the finger at a yarn end detecting position;

FIGS. 16 and 17 are a side view and a plan view, respectfully of a cop carrier at the working position at which the taking off of the tail end yarn takes place;

FIG. 24 is diagrammatic drawing illustrating an outline of an embodiment of the apparatus of the present invention;

FIGS. 25A and 26A are fragmentary side view of cam mechanism partly in section, for turning a lower finger and an upper finger respectively;

FIGS. 25B and 26B are a plan view and a side view, respectively shown an electrical means for turning a upper finger according to the position of lower finger, respectively;

Main elements of the automatic cop supplying apparatus

In the above-mentioned embodiment, the discharged failed cops are again supplied to the rotary chuter *b* to give them another chance of supplying yarn to the winding units, however, experience shows that cops which have failed to have the yarn end retrieved more than twice will have great difficulty in having the yarn end retrieved, therefrom. In other words, if such failed cops contained in the bobbin chuter increases the number of empty cops carriers at the reserving position of the cop supply means increases. Consequently, the working efficiency of the apparatus becomes low. To prevent this lowering of working efficiency, failed cops which failed once are supplied only once again to the bobbin chuter *b* as shown in a modified embodiment of the invention.

Cop carrying means

Figure 3:
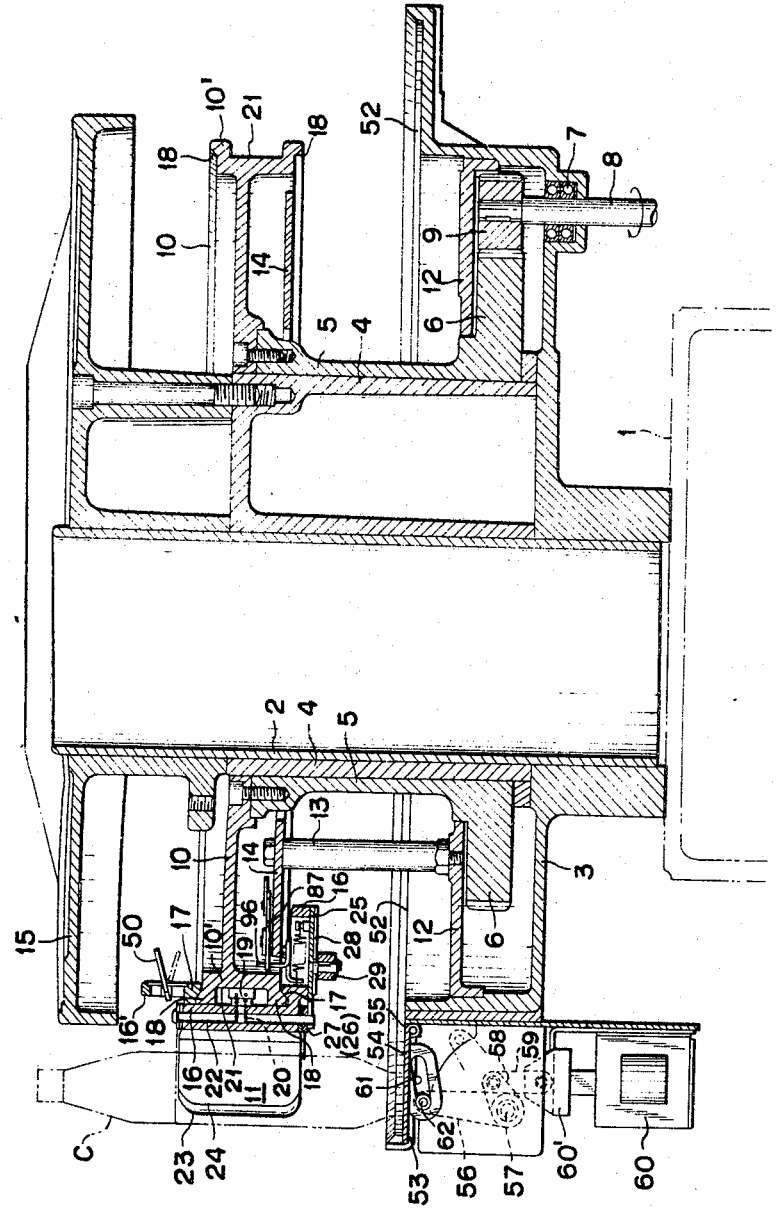
FIG. 3 is a side view, partly in section of apparatus embodying the invention.

Referring to FIG. 3, a suction box 1 is provided in the apparatus. A suction pipe 2 and a circular bracket 3 are secured to the suction box 1 and a cylinder 4 is rigidly mounted on the circular bracket 3 in such a way that the cylinder 4 surrounds the suction pipe 2. A revolving cylinder 5 having a spur gear 6 formed on a flange at its lower portion is rotatably mounted on the cylinder 4 as shown in FIG. 3. The spur gear 6 formed on a spur gear 9 secured to an upper end of a vertical revolving shaft 8 supported by a bearing 7 on the bracket 3. The vertical shaft 8 is rotated twice by the power transmission means of the automatic winder (not shown) for each passage of the winding units. A pulley 10 is secured to the upper portion of the revolving cylinder 5. A plurality of cop carriers 11 (for example, fourteen carriers in the present embodiment) are arranged circumferentially of the pulley 10 in such a way that every carrier 11 in a free condition can be transported with the pulley 10, but is stopped separately at the predetermined working positions by action of stop means.

A cover plate 12 is secured to the bracket 3 so as to cover the spur gears 6 and 9, and a circular disc 14 is supported by three pillars 13 disposed on the cover plate 12. A magazine cover 15 is mounted on the top end of the cylinder 4.

Each cop carrier has a bracket 16 having a dovetail groove 17 formed at its back portion. The dovetail groove 17 of the bracket 16 is engaged with a dovetail 18 formed on the flanged portion 10' of the pulley 10. A pair of slide pins 19 are disposed at the symmetrical position concerned at the right hand and left hand sides of the bracket 16 in such a way that the pins 19 can be moved freely forward and backward, so as to provide close engagement between the dovetail 17 and dovetail groove 18 of the pulley 10 by pressing of the head portion of the slide pin 19 against a grooved surface 21 of the pulley 10 and pressing the bracket 16 to the left hand direction in FIG. 3.

Figure 4:
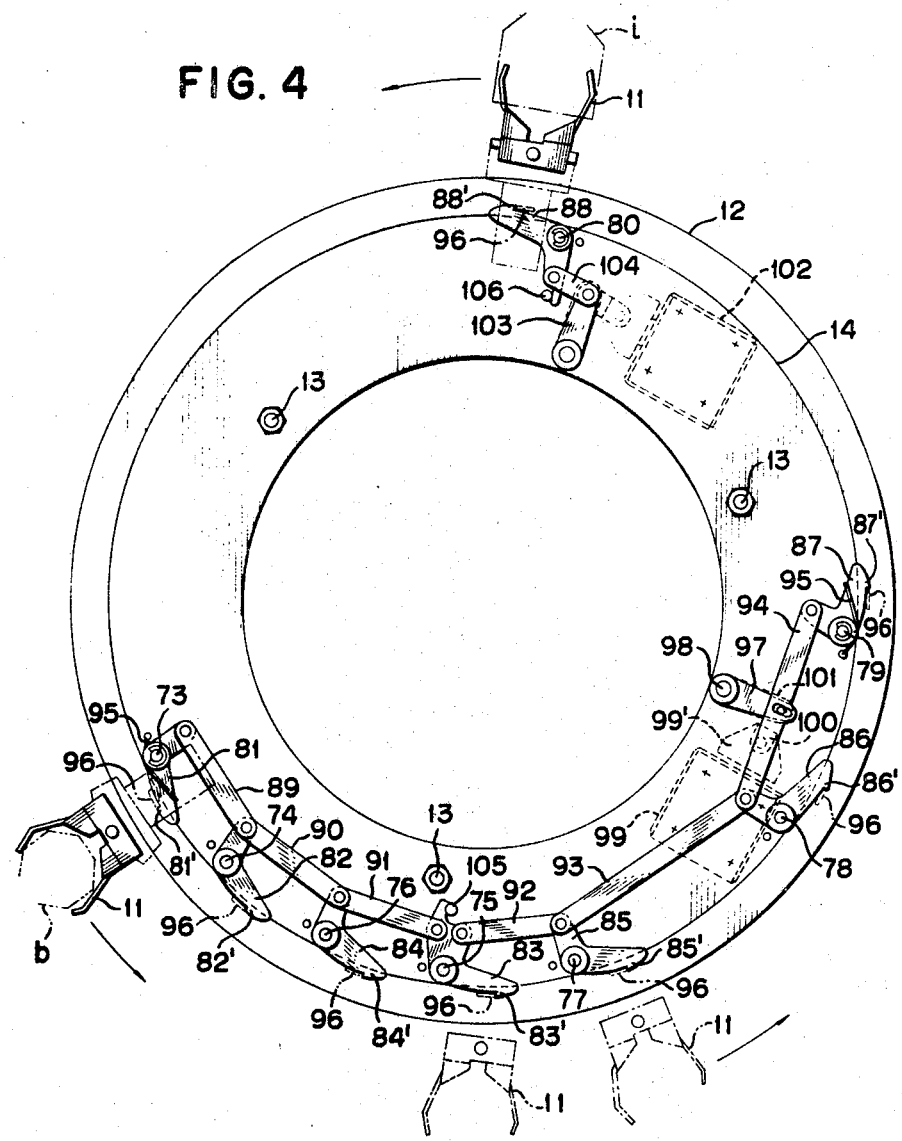
FIG. 4 is a plan view of magazine trigger mechanism according to the invention.
Figure 5:
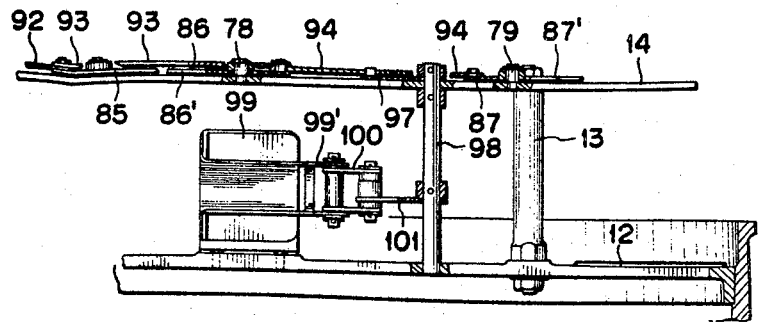
FIG. 5 is a fragmentary elevation view, partly in section of the magazine trigger mechanism and its actuating means shown in FIG. 4.

Referring to FIG. 4, pins 73, 74, 75, 76, 77, 78, 79 and 80 are secured to the circumferential portion of the circular disc 14 at the position of B, C, D, E and G, and intermediate positions between G and E, and I respectively, and curved triggers 81, 82, 83, 84, 85, 86, 87, and 88 are pivotably secured to the respective pins, the triggers 81, 82, 83, 84, 85, 86, 87 and 88 are provided with hook 81', 82', 83', 84', 85', 86', 87', and 88', respectively, and are connected together with links 89, 90, 91, 92, 93 and 94 in such a way that adjacent triggers are connected each other with the respective link, and are provided with a spring except the triggers 81 and 87 which are provided with two springs, respectively. Consequently, all triggers can be turned counterclockwise altogether in FIG. 4. The hook 81', 82', 83', 84', 85', 86', 87' and 88' of the respective triggers are projected beyond the circumference of the circular disc 14, thereby a projection piece 96 (referring to FIG. 3) disposed upwardly to the lower portion of the bracket 16 is caught by the above-mentioned hooks of the triggers. A lever 97 is pivotably secured by a pin 98 to the intermediate position between triggers 86 and 87 so as to connect the middle point of the link 94 disposed between triggers 86 and 87 with the end of the lever 97, thereby when the lever 97 turns clockwise in FIG. 4, triggers 81, 82, 83, 84, 85, 86 and 87 turn counterclockwise opposing to a spring 95, and consequently, hooks 81', 82', 83', 84', 85', 86' and 87' are receded from the circumference of the circular disc 14 so as to release the engagement between the hooks and the projection piece 96 of the bracket 16. The above-mentioned releasing motion of the projection piece 96 is operated by the electric turning motion of the lever 97 by the actuation of the solenoid 99.

Figure 1:
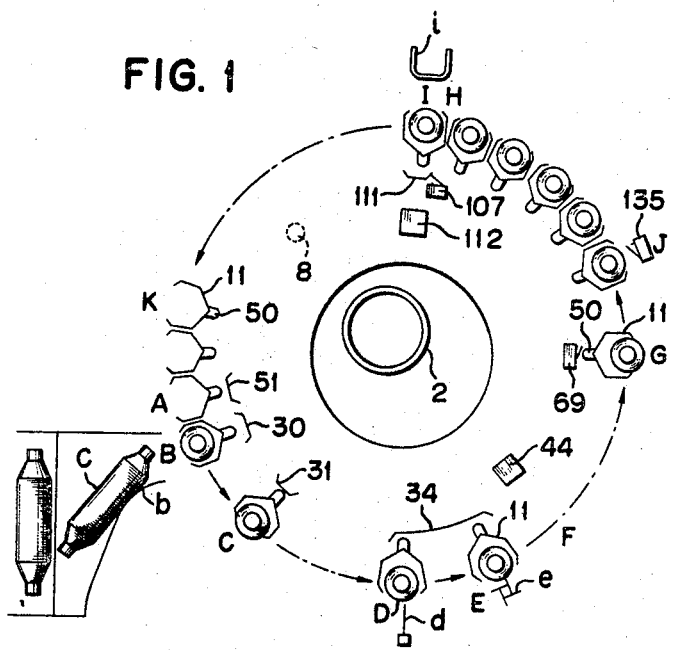
FIG. 1 is a diagrammatic drawing illustrating an outline of the apparatus of the present invention for explaining the invention.
Figure 22:
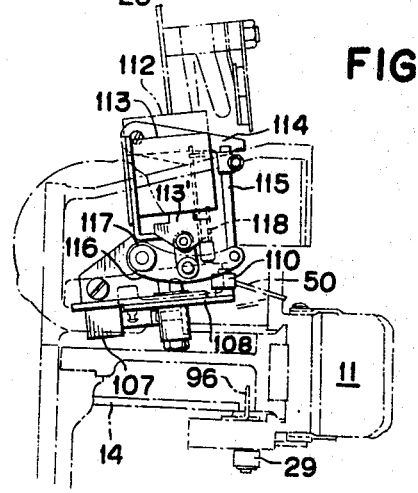
FIGS. 22 and 23 are a side view and an elevation view of actuating means of a knot-tier in the apparatus of the invention.
Figure 23:
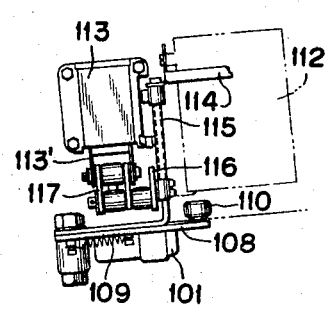
Figure 27A:
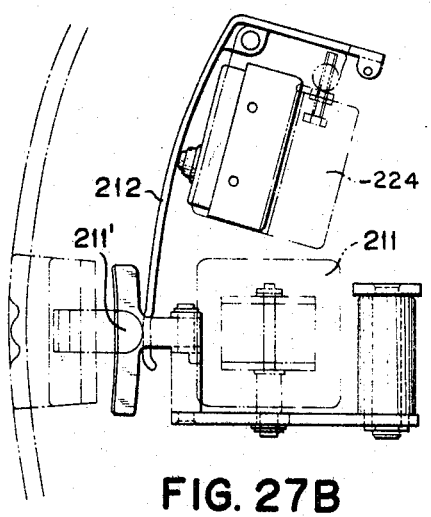
FIGS. 27A and 27B are plan and side views of electrical means for turning upper finger according to a cam means, respectively.
Figure 27B:
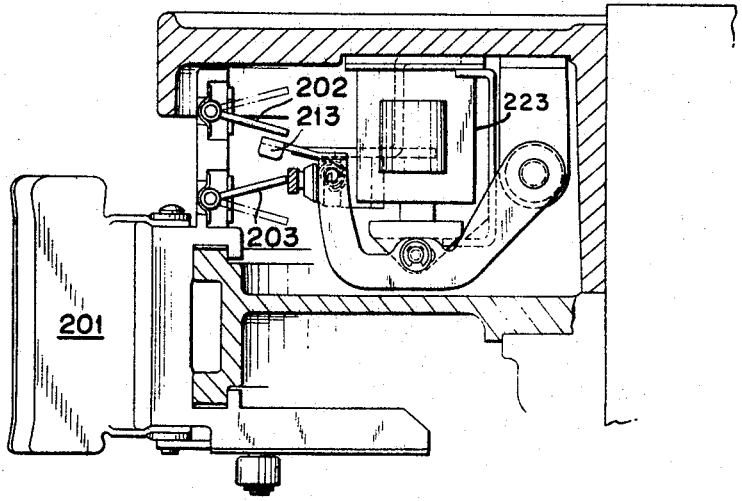

A solenoid 102 is mounted on the cover plate 12, and is connected to the trigger 88 through a lever 103 and link 104 having the same mechanism as that for transmitting the motion of the solenoid 99 to the lever 97, thereby, when the solenoid 102 is energized, the hook 88' of the trigger 88 is receded from the circumference of the circular disc 14 and the projection place 96 mounted on the carrier 11 is released at the position i in FIG. 1. Stop pins 105 and 106 are secured to the upper surface of the circular disc 14 for deciding the position of the triggers by the action of pins 105 and 106, thereby the engagements of the projection piece 96 of the carrier 11 with hooks 81', 82', 83', 84', 85', 86', 87' and 88' of the respective triggers are maintained in a stable condition. The solenoid 102 is connected with a limit switch whose electric circuit is closed once for each passage of the winding units by the action of a cam hereinafter described, a normally closed limit switch (so-called B type) is mounted under the magazine cover 15 at H point in FIG. 1, its electric circuit is opened by an action of a finger 50 of the carrier 11 which is maintained at its elevated position as shown in FIGS. 22 and 23, and a limit switch 107 forms an electric circuit of the solenoid 102 together with the above-mentioned limit switch and a relay (not shown), thereby, when once the solenoid 102 is energized, the energized condition of the solenoid 102 is maintained till the electric circuit of the limit switch 107 is opened. A lever 105 for actuating the limit switch 107 is turned horizontally by the action of the elevated finger 50 and the top portion of the lever 108 is maintained at the projected condition in the passage of the finger 50 before the actuation of the finger 50. An utifriction roller 110 is disposed at the top end portion of the lever 108 and a spring 109 is connected to the lever 108 so as to bestow the return motion to the lever 108.

Cop carrier and its related members

Referring to FIGS. 1, 3, 16, 17, 18 and 19, a vertical axle 22 is disposed to the central portion of the bracket 16, a pair of base portions of a pair of cop holders 23 and 24, forming curved plates respectively, are loosely disposed to the vertical axle 22, a pair of pins 26 and 27 secured to the front end portion of a slide plate 25 are engaged with the under surfaces of cop holders 23 and 24, and the slide plate 25 is slidably supported by the under surface of the bracket 16 in such a way that the slide plate 25 can be slid freely in the forward and rearward directions (left and right hand directions in FIG. 3), thereby, when the slide plate 25 slides forward (left hand direction in FIG. 3), a cop holders 23 and 24 are closed, on the other hand, when the slide plate 25 slides rearward, the holders 23 and 24 are opened. One end of spring 28 is connected to the predetermined position on the bracket 16 and the other end to the portion of the slide plate 25 so as to provide the slide plate 25 with a tendency to move forward, and to also provide holders 23 and 24 with a normally closed stationary condition. A roller 29 is mounted on the under surface of the slide plate 25.

A cam 30, FIG. 1, is disposed to the upper surface of the cover plate 12 at the position of rotary chute b (B position in FIG. 1) so as to press the top roller 29 of the respective cop carrier 11 toward the left hand direction in FIG. 3, thereby, the cam 30 positively opens the closed cop holders 23 and 24 which are maintained in the closed condition until just before the cutting of cop c from the rotary chute b, so as to receive the supplied cop securely.

Another cam 31 (FIG. 1) is disposed at the corresponding position c of the taking-off device of the tail end of the cop, in such a way that the cam 31 presses the roller 29 toward the left hand direction in FIG. 16, so as to prevent dropping of the cop c from the positively closing cop holders 23 and 24 which are supporting the cop c just before the taking-off operation of the tail end of yarn of the cop c by a suction pipe. A fixed type of cam may be used for obtaining the above-mentioned effect as a substitute for the cam 31, however, in the present embodiment, as shown in FIG. 16, the cam 31 is formed as an integral part with the upper arm of a bell crank lever 33 which is provided with a tendency to turn counterclockwise by an action of a spring 32, thereby, the cam 31 is pressed positively against the roller 29 so as to obtain a stronger and more secure supporting effect of cop than the case the fixed type cam is used.

Figure 18:
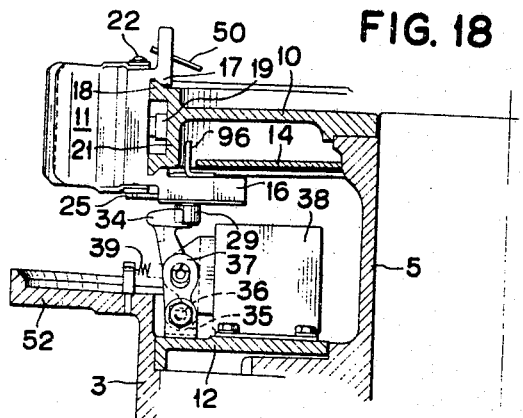
FIGS. 18 and 19 are a side view and a plan view respectively of the cop carrier at a working position in which the yarn end is retrieved.
Figure 19:
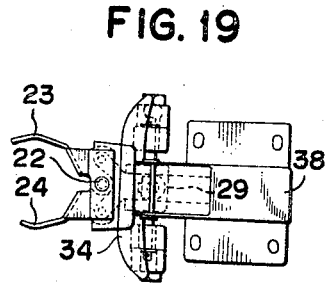

A cam 34 is disposed at the position between position and E position shown in FIGS. 1, 18 and 19 in such a way that the cam 34 is formed an integral part at an upper end portion of a lever 37 which is turnably supported by a pin 36 disposed to a bracket 35 mounted on the cover plate 12 in such a way that the lever 37 can turn in a forward and rearward directions (in the right hand and left hand directions in FIG. 18), thereby, the holding pressure of cop holders 23 and 24 of the cop carrier 11 is gradually relaxed by the cam 34 while the carrier 11 is carrying from the position for breaking the back winding of yarn wound around the cop by a searcher d positioned at D position in FIG. 1 to the position F in FIG. 1 for loosening yarn end by a beater e. A solenoid 38 disposed on the cover plate 12 positively actuates to turn the lever 37 and a spring 39 provides the lever 37 with turning motion to the normal position when the solenoid is dis-energized.

A cam 111 is mounted on the cover plate 12 at position I in FIG. 1, whose action is the same as that of cam 30, consequently, the roller 29 of the cop carrier 11 is pushed by the cam 111, so as to open cop holders 23 and 24 positively and bestow smooth transferring a new cop to the winding unit when a trap door 72 disposed under the cop holders 23 and 24 of the carrier 11 is opened after completion of the knot-tying of the yarn end of the cop with a tail end of yarn of a package of the corresponding winding unit.

Detecting means for detecting the completion of retrieving yarn end of the cop

Referring to FIGS. 1, 10, 11, 12, 13, 14 and 15 the detecting device 44 for detecting the completion of retrieving yarn end from the cop comprises a light receiver 40 and light source 41 which are mounted on the magazine cover 15 at position F in FIG. 1, in such a way that the passage of the yarn end already retrieved from the cop in the preceding stage can be passed through the intervening space between the light receiver 40 and light source 41. A cadmium cell 42 for transforming light signals into the corresponding electrical signals is contained in the light receiver 40 and an electrical lamp 43 is disposed in the light source 41, respectively. As shown in the drawings of FIGS. 14 and 15, a solenoid 45 is mounted downwardly on the under surface of the magazine cover 15 at a position adjacent to the detecting device 44 a transversal lever 46 is pivotably disposed under the solenoid 45 by a pivot pin 47 in such a way that the lever 46 is positioned adjacently upon the pulley 10 and a portion of the lever 46 is connected with a plunger 45 of the solenoid 45. A cam 48 for lifting the finger 50 is supported by the free end portion of the lever 46, and a spring 49 is connected to the cam 48 to keep the cam 48 at a stationary position. The plate-shaped finger 50 is mounted on the upper portion of the bracket 16 of the respective cop carrier 11 in such a way that the finger 50 faces backward (right hand direction in FIG. 14). The top end portion of the finger 50 faces backward and is kept at the alternative positions of the elevated position (a position shown by a solid line in FIG. 14) or the lowered position (a position shown by the dotted line in FIG. 14), and when the finger 50 is positioned at the lowered top end of the finger 50 is kept an adjacent position to the cam 48. The other cam 51 (FIG. 1) for pushing down the finger is disposed at the under surface of the magazine cover 15 and when the finger 50 of each cop carrier 11 arrive at the working position of the cam 51 and pass under the cam 51, thereby the fingers kept at the elevated position are pushed down positively by the action of the cam 51.

Means for discharging cops

Figure 2:
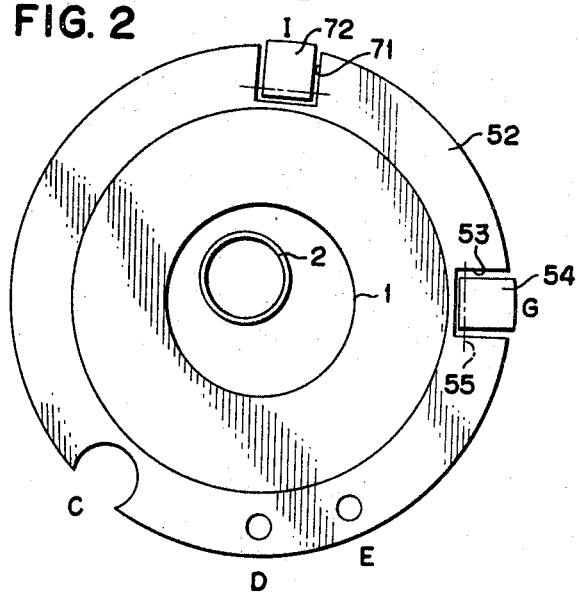
FIG. 2 is a plan view of a magazine table of the apparatus of the invention.
Figure 20:
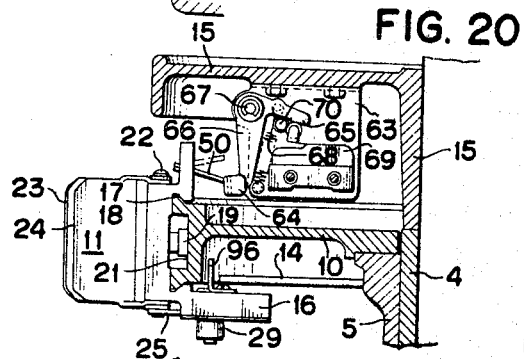
FIGS. 20 and 21 are a side view and plan view showing the relation between the finger and working cam at the position for discharging failed cops, respectively.
Figure 21:
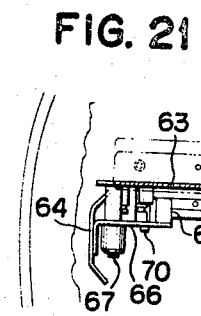

Referring to FIGS. 2 and 3, a magazine table 52 is disposed upon the brackets 3, and a transversal U-shaped cut portion 53 for discharging failed cops successively is formed at G position in FIG. 1, as shown in FIG. 2, a trap door 54 is hinged 55 in the cut portion 53 in such a way that the trap door 54 is maintained in the same plane of the magazine table 52 in the normal condition. A lever 56 is pivoted to the pivot bearing 57, so as to support a lever 58 on the same bearing 57 and the free end of the lever 58 is connected to a plunger of a solenoid 60 disposed under the lever 58 through a link 59. A pin guide 61 is formed on the under surface of the trap door 54 and a pin 62 disposed at the top end portion of the lever 56 is engaged with the pin guide 61. Thereby when the solenoid 60 actuates, the trap door 54 is opened by the link motion of the link 59, and levers 58 and 56. A bracket 63 is rigidly mounted on the under surface of the magazine cover 15 at the position G in FIG. 1 (referring to FIGS. 20 and 21) a bell crank lever 66 provided with a cam portion 64 formed at its bottom end portion and an operation piece 65 for operating switch disposed at its horizontally end portion is pivotably secured to the bracket 63 by a pin 67 in such a way that the bell crank lever 66 is always actuated to turn clockwise by a spring 68, thereby, the cam 64 of the lever 66 is in a waiting position for pushing the finger 50 of the carrier maintained at the lowest position. A limit switch 69 is adjacently positioned to the finger 50 when a lever 66 turns counterclockwise in FIG. 20. The limit switch 69 is connected to the solenoid 60. A stop pin 70 restricts the position of the lever 66 at the predetermined position.

Referring to FIG. 2, a cut portion 71 is disposed to the magazine table 52 at position I in FIG. 1 for discharged normal cops which have completed the motion of retrieving yarn end, the mechanism for opening and closing the trap door 72 is the same as that of above-mentioned mechanisms comprising elements designated by 56, 57, 58, 59, 60, 61, and 62 for the trap door 54. The only difference is the electric circuit in which a solenoid for actuating the mechanism for the trap door 72 is connected with the other limit switch 69, the trap door 72 is opened once for each passage of the winding unit (not shown).

Knot-tier

Referring to FIGS. 6, 7, 22 and 23, a knot-tier 112 is disposed to the cop transferring position (I position in FIG. 1), in a solenoid 113 for operating the clutch of the knot-tier 112 is connected to the electric circuit of a limit switch 139 whose electric circuit is opened and closed by the action of a knotter actuating cam 136 which rotates together with operating cams 137 and 138 for operating limit switches 140 and 141 forming the respective electric circuit of solenoid 102 for operating the trigger 88 and operating solenoid for operating the trap door 72, respectively. A rod 115 is downwardly mounted on the top end portion of a clamp lever 114 of the knot-tier 112, a lever 116 is articulated at its top end portion to the lower end portion of rod 115, the lever 116 is connected with a plunger 113' of the solenoid 113, through a link 117, thereby, when the solenoid 113 is energized, the clamp lever 114 is turned counterclockwise in FIG. 22, consequently, the knot-tier 112 starts to operate by the actuating of the knotter clutch (not shown). A compression spring 118 returns the lever 116 to the normal position.

Control cam mechanism

Figure 6:
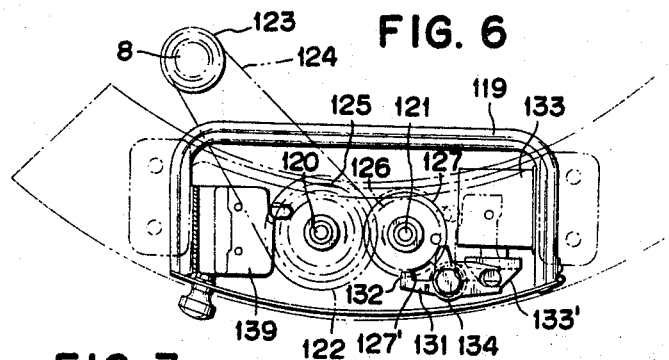
FIGS. 6 and 7 are a plan view illustrating a bottom portion and a longitudinal sectional elevation of the cam box, respectively.
Figure 7:
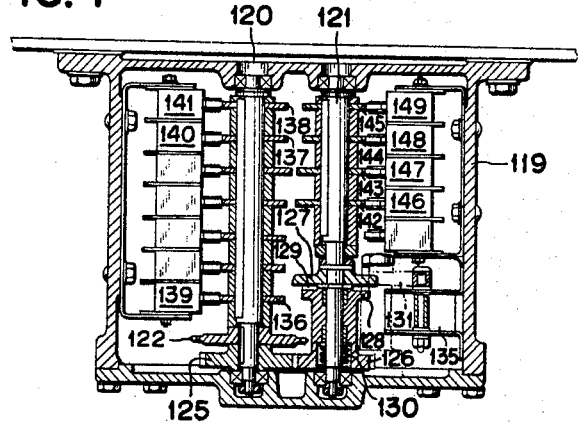
Figure 8A:
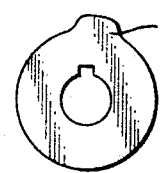
FIGS. 8A, 8B and 8C are respective plan view of three embodiments of cams secured to the main driving shaft.
Figure 8B:
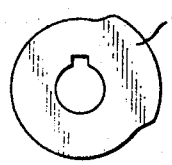
Figure 8C:
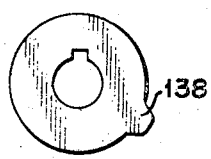

Referring to FIGS. 6 and 7, a cam box 119 is disposed under the bracket 3, vertical shafts 120 and 121 are rotatably supported inside the cam box 119, a sprocket wheel 122 is secured to the end portion of the vertical shaft 120, and endless chain 124 provided the driving relation between the sprocket wheel 122 and a sprocket wheel 123 secured to the vertical shaft 8 (FIG. 3) which rotates twice by the power transmission of the automatic winder with each passage of the winding units, thereby, the vertical shaft 120 is normally rotated once for each passage of the winding units. Further, a spur gear 125 is secured to the vertical shaft 120 at a position adjacent to the sprocket wheel 122, a spur gear 126 which is meshed with the spur gear 125 is idly mounted on the end portion of the vertical shaft 121. A clutch wheel 127 is secured to the vertical shaft 121 at a position adjacent to the spur gear 126, a cork plate 129 is intermittently disposed to a space between the friction wheel 128 formed as an integral part with the boss of the spur gear 126 and the clutch wheel 127, a compression spring 130 disposed inside the spur gear 126 provides the frictional contact of the friction wheel 128 with the clutch wheel 127 through the cork plate 129 under pressure, and when the clutch wheel 127 is maintained in a free condition, the rotation of the vertical shaft 120 is transmitted to the vertical shaft 121 through spur gears 125 and 126, and friction clutches comprising the friction wheel 128, the cork plate 129 and the clutch wheel 127. In present embodiment, the ratio of rotation between the vertical shaft 120 and the vertical shaft 121 is adjusted to 1:1.2. A plunger 133' of the solenoid 133 is connected with an end portion of a clutch operating lever 131 having pawl 132 for engaging with the cut portion 127' of the clutch wheel 127, thereby, when the solenoid 133 is energized, the clutch operating lever 131 turns counterclockwise in FIG. 6, the pawl 132 releases its engagement with the cut portion 127', consequently, the clutch wheel 127 becomes a free condition, however, the pawl 132 normally contacts the circumferential surface of the clutch wheel 127. The solenoid 133 is connected with a normally closed limit switch 135, hereinafter called B type switch which is disposed at the position J in FIG. 1 and is opened once with each passage of the cop carrier 11, the solenoid 135 is connected with a delay relay so as to de-energize the solenoid 133 while the carrier 11 faces the limit switch 135 for a predetermined time or to excite the solenoid 133 when the next cop carrier 11 does not arrive in a predetermined time after the cop carrier 11 has passed before the limit switch 135. The knotter actuating cam 136 and the cam 137 are secured to the vertical shaft 120 in a normally rotating condition, limit switches 139, 140 and 141 are disposed at positions facing the above-mentioned three cams, respectively, in such a way that the limit switch 139 facing the cam 136 is connected to the clutch operating solenoid 113 and the limit switch 140 facing the cam 137 is connected to the trap door operating solenoid (not shown), and the limit switch 141 facing the cam 138 is connected to the solenoid 102 for operating the trigger 88. Therefore, the trap door is operated by the action of the cam 137 and the trigger 88 is operated by the action of the cam 138 respectively. Four cams 142, 143, 144 and 145 are secured to the vertical shaft 121. The cam 142 actuates the motion of triggers 81, 82, 83, 84, 85 and 86 and 87 which are disposed at the positions from B to G in FIG. 1, the cam 143 actuates a cop crank spindles (not shown) at D and E in FIG. 1, respectively, the cam 144 actuates the opening motion of the cop holders 23 and 24 of the cop carrier 11 which has arrived at position D in FIG. 1, the cam 145 controls the operation of the trap door 54 disposed at the position G in FIG. 1, and above-mentioned four cams 142, 143, 144 and 145 are rotated when clutches comprising the friction wheel 128, the cork plate 129 and the clutch wheel 127 are operated. Four limit switches 146, 147, 148 and 149 are disposed in front of the above-mentioned cams 142, 143, 144 and 145 in such a way that the limit switch 146 disposed before the cam 142 is connected to the solenoid 99 for operating the triggers, the limit switch 147 facing the cam 143 is connected to the electric source for driving the cop crank spindle, the limit switch 148 facing the cam 144 is connected to the solenoid 38 (in FIG. 18) for operating the cam 34, the limit switch 149 (referring to FIGS. 2 and 3) facing the cam 145 is connected to the solenoid 60 (FIG. 3) for operating the trap door 54.

Operation of the cop carrier and its related motion

Referring to FIG. 3, when the automatic winding is driven, the vertical shaft 8 rotates clockwise, thereby, the pulley 10 is driven counterclockwise by the rotation of the revolving cylinder 5 around the cylinder 4 by way of the rotation of the spur gear 6 meshing with the spur gear 9 secured to the vertical shaft 8. On the other hand, as the dovetail groove 17 of the bracket 16 of each cop carrier 11 engages with the dovetail 18 of the flange 10' of the pulley 10, and the carrier 11 contacts the pulley 10 by the pushing of the respective slide pin 19 caused by the spring 20, the carrier 11 supported on the pulley 10 is carried by the rotation of the pulley 10 while the respective projection pieces 96 do not receive any disturbing action of triggers 81, 82, 83, 84, 85, 86, 87 and 88, consequently, the fourteen carriers 11 are carried counterclockwise with the respective intervals between them.

When the new cop carrier 11 supplies normal cop to the winding unit (not shown) at the position of I in FIG. 1, the trigger 88 which was in a position projection beyond the circumference of the circular disc 14 (shown in FIG. 4) is receded as hereinafter described in detail, thereby, the hook 88' of the trigger 88 does not engage with the projection piece 96 of the cop carrier 11, consequently, the cop carrier 11 which has discharged normal cop to the winding unit is displaced forward by the rotation of the pulley 10 which is normally rotating toward the direction shown by the arrows in FIGS. 1 and 4. When the empty cop carrier 11 arrives at position A in FIG. 1, as the cam 51 for leading the finger downward is disposed at the A position, the finger 50 of the carrier 11 which is maintained in its elevated position is led downward by the action of the cam 51, and the carrier 11 is displaced to the position B. As mentioned above, the fingers 50 of the respective carriers 11 following each other one by one are led downwardly before arriving at the position B.

At the position B, as the trigger 81 projects beyond the circumference of the circular disc 14, the projection piece 96 disposed on the carrier 11 which has arrived at the position B engages with the hook 81' of the trigger 81, thereby, further displacement of the cop transferring carrier 11 is stopped, on the other hand, as the cam 30 for actuating the roller 29 disposed to the carrier 11 is disposed at position B, the cam 30 pushes the roller 29 is the right hand direction in FIG. 18, the slide plate 25 supporting the roller 29 is displaced in the right hand direction consequently, cop holders 23 and 24 of the slide plate 25 are opened as shown in FIG. 19. The above-mentioned motion of holders 23 and 24 are described by referring to FIG. 18, because the cam 30 has the same construction as that of cam 34. As new cops are supplied to the respective cop transferring carriers 11 one by one by the rotary chute b disposed at the position B (referring to FIG. 1) the respective carriers 11 can receive fresh or new cops from the rotary chute b in the opened condition of the holders 23 and 24.

Referring to FIG. 6, as the vertical shaft 120 is driven once for each pasage of the winding units as described already, when there is no cop carrier before the normally closed limit switch 135 disposed at the position J, the contact of the limit switch 135 is closed and the solenoid 133 is excited, the plunger 133' pulls the end portion of the operating lever 131 so as to turn the operating lever 131 counterclockwise in FIG. 6, the pawl 132 disposed to the top end portion of the lever 131 releases its engagement with the cut pawl 127' of the clutch wheel 127, the clutch wheel 127 becomes a free condition thereby, the clutch wheel 127, the friction wheel 128, the cork plate 129 are engaged together, consequently, the rotation of the vertical shaft 120 is transmitted to the vertical shaft 121 through the gearing of the spur gears 125 and 126, and the friction clutches comprising the clutch wheel 127 and the friction wheel 128 and the cork plate 129 and the spring 130, the vertical shaft 121 is driven at a higher speed than that of the vertical shaft 121 actuates the limit switch 146 so as to close the contact of the limit switch 146, and energize the solenoid 99. By the above-mentioned motion of the limit switch 146, the plunger 99' pulls the lever 101 by the link motion of the line 100 as to turn the shaft 98 supporting the lever 101, thereby, the lever 97 disposed to the circular disc 14 is turned clockwise in FIG. 4, consequently, triggers 81, 82, 83, 84, 85, 86 and 87 connected with the lever 97 by way of the respective links 94, 93, 91, 90, and 89 are turned simultaneously in the counterclockwise direction in FIG. 4. Consequently, the hook 81' of the trigger 81, which was maintained projected beyond the circumference of the circular disc 14 when the empty cop carrier 11 receives a fresh cop from the rotary chute, is receded from the circumference of the disc 14, thereby, the hook 81' is maintained at out of the working position to the projection piece of the carrier 11, accordingly, the carrier 11 which has received fresh cop is carried to the position C in FIG. 1.

Figure 9A:
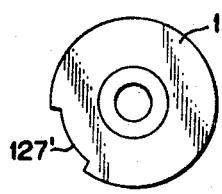
FIGS. 9A, 9B, 9C, 9D and 9E are respective plan views of clutch wheel and four kinds of cams secured to the driven shaft.
Figure 9B:
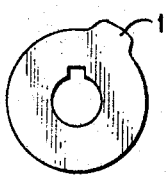
Figure 9C:
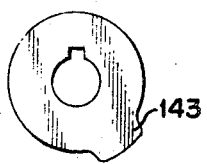
Figure 9D:
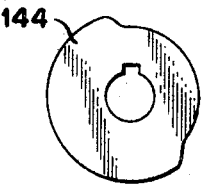
Figure 9E:
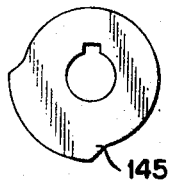
Figure 10:
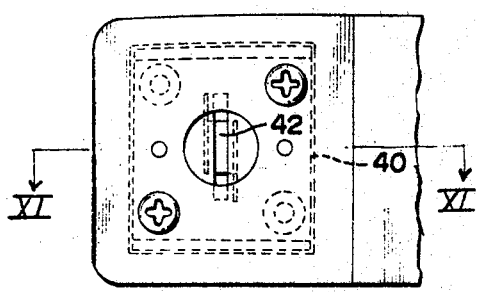
FIG. 10 is a plan view of a lower portion of a light-receiving portion of the yarn end detecting device according to the invention.
Figure 11:
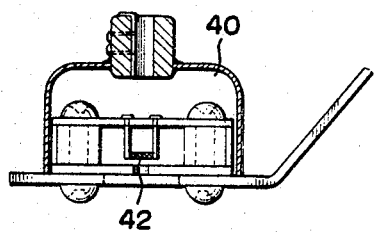
FIG. 11 is a sectional view taken along section; line XI—XI in FIG. 10.
Figure 12:
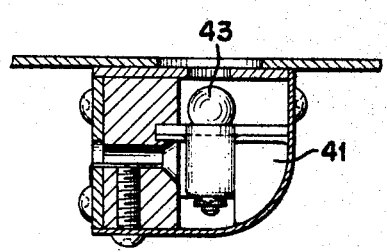
FIG. 12 is a side view in section of the light source of the yarn end detecting device.
Figure 13:
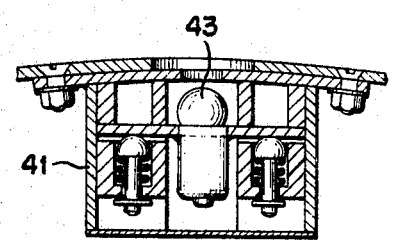
FIG. 13 is an elevation view in section, of the light source of the yarn end detecting device.

Further, as the working portion (projected portion) of the cam 142 is not so large as shown in the drawing of FIG. 9B, the working time of the cam 142 on the limit switch is quite short, that is, the operation of the solenoid 99 is finished in a short time, the trigger 81 which has once receded returns to its normal position as shown in FIG. 4 in a short time after the starting of the carrying of the carrier 11 and the other triggers 82, 83, 84, 85, 86 and 87 turn together with the trigger 81. Consequently, when the carrier 11 arrives at the position C, the projection piece 96 of the carrier 11 engages with the hook 82' of the trigger 82 and the carrier 11 stops further displacement, the next carrier 11 arrives at the position B at the same time as the stopping of the former carrier 11 by the above mentioned engaging motion and receives a fresh cop from the rotary chuter b. Then the cop holders 23 and 24 of the carrier 11 which has arrived at the position C is positively closed by the leftward displacement of the roller 29 (in FIG. 16) by the pushing action of the cam 31 disposed at the position C, thereby, the holding pressure of the holders 23 and 24 is increased. Therefore, if the taking-off device for taking off the tail end of yarn of the cop works at the above-mentioned in the condition of increasing the holding pressure of holders 23 and 24, the tail end yarn wound around the bottom end portion of the cop can be taken off very easily and pipe 2. After taking off the tail end yarn of the cop as mentioned above, the cop carrier 11 is released from the trigger 82 which changes its position periodically between the working position and releasing position, and is carried to the position D, at the same time as the above-mentioned motion, the carrier 11 which is carried to the position of C, the further carrier 11 follows after the above-mentioned following carrier 11 starts to be carried to the position of B, and the carriers received the operations by the same manner as described above.

Thus, when the cop carrier 11 arrives at the position of D where the cam 34, which can be moved forward and backward, is disposed (referring to FIGS. 18 and 19), the cam 34 moves forward to the operating position by the motion of the solenoid 38, the roller 29 disposed to the carrier 11 is pushed as to open the cop holders 23 and 24 positively. That is, as the vertical shaft 121 rotates once at each signal of the limit switch 135 so as to rotate the cams 142, 143, 144 and 145, the contacts of the limit switches 146, 147, 148 and 149 facing the respective cams 142, 144, 143 and 145 are opened or closed by each rotation of the above-mentioned cams. And even when the carrier 11 arrives at the position of D, the above-mentioned opening and closing motions of the contacts of the limit switches continue, thereby the cam 144 actuates the limit switch 148 so as to energize the solenoid 38, the cam 34 disposed at the same height as that of the passage of the roller 29 is displaced by the action of the solenoid 38 in the right hand direction in FIG. 18 so as to push the roller 29 positively, accordingly, the roller 29 is displaced in the condition opposing the action of the spring 28, the cop holders 23 and 24 which are holding cops are opened positively, consequently, the cop held by the cop holders 23 and 24 is released from its holding condition. When the cam 144 actuates limit switch 148, the cam 143 secured to the same shaft of the cam 144 closes the contact of the limit switch 147 successively, consequently, the cop chuck spindle (not shown) positioned the position D is rotated so as to rotate the cop several turns. By the rotation of the cop as described above and the shifting of the searcher d which has a function of breaking the back wind of cops along the axial direction of the cop, the back winding of the cop is broken down and after the breaking down of the back wind the above-mentioned cop chuck spindle stops its rotation.

In the present invention, the trigger 84 is disposed at the intermediate portion between positions D and C, however the trigger 84 can be omitted for simplifying the mechanism without disclaiming the purpose of the invention. The trigger 86 can also be omitted for the same reason as that of the trigger 84.

When breaking down the back winding of cop by the searcher d while the trigger 83 is engaging with the projection piece 96 of the carrier 11, as the trigger 83 is receded to the releasing position by the action of the solenoid 99 which is excited again by the rotation of the vertical shaft 121, the carrier 11 released from the trigger 83 is carried further from the position D to E position, and is stopped by the other trigger disposed at that position. As already described the cam 34 extends from the position D to the position E, when the cam 34 is moved outwards according to the action of the solenoid 38, the roller 29 disposed to the carrier 11 is pushed by the cam 34, thereby, cop holders 23 and 24 are positively opened so as to release the cop, then the cop chuck spindle is rotated so as to rotate the cop several turns. On the other hand, the beater e is disposed at the position E as a substitute for the searcher. The beater e is rotating in a contacting condition with the cop, and the suction nozzle (not shown) is disposed at a position superimposed upon the circular passage of cops in such a way that the opening of the suction nozzle can be faces the cops, thereby, when the beater acts on the surface of the rotating cop, the yarn end retrieving motion is operated the retrieved yarn end of the cop is carried to the side of the suction pipe 2 from the suction nozzle and the yarn Y retrieved from the cop held by the carrier 11 is horizontally stretched upon the magazine cover 15 as shown in FIG. 14.

After completion of the above-mentioned yarn end retrieving motion as the trigger 85 is displaced to the releasing position for a while by the action of the solenoid 99, the carrier 11 is further carried from the position E to G in FIG. 1. As the detecting device 44 for detecting the completion of the yarn end retrieving motion is disposed at the intermediate portion F between the positions E and G and the light receiving member 40 and light source 41 are disposed in such a way that the yarn stretched upon the magazine cover 15 passes the intermediate space between both members 40 and 41, consequently, when the yarn retrieving motion is completed and the cop carrier 11 is carried to the position G the retrieved yarn passes through the space between the light receiving member 40 and the light source 41, thereby, the intensity of light received by member 40 is interfered. In the present embodiment, sulfide-cadmium cell is used as the light receiving member 40, when the light intensity received by the sulfide-cadmium cell is interfered, the deviation of the resistance between the terminals of the sulfide-cadmium cell increases, the variation of the above-mentioned resistance is picked up as a variation of the electric voltage, the picked-up voltage is amplified so as to actuates the relay, thereby the solenoid 45 is actuated. Consequently, when the retrieved yarn end stretched upon the magazine cover 15 passes through the above-mentioned space, the solenoid 45 is energized and the lever 46 is turned clockwise in FIG. 14, and the top portion of the lever 46 is displaced upward so as to shift the finger 48 upward. This is, the finger 50 of the carrier 11 which was displaced downward at the positoin A is shifted upward by the action of the cam 48. On the other hand, when the yarn end retrieving motion fails, the light intensity received member 40. If the relay is adjusted so as to maintain in normal position, the solenoid 45 is not energized, therefore, the lever 46 is positioned at its predetermined position, the cam 48 for shifting the finger 59 is maintained at its normal position, and the position of the finger of the carrier 11 is maintained at the lowered position, when the carrier 11 arrives at the position G.

According to the above-mentioned operation of the carrier 11, the fingers 50 of the carriers 11 are classified into two types, that is, fingers maintained at the elevated position, and fingers maintained at the lower position. When the carriers 11 arrive at the position G, as the trigger 87 disposed at the position G engages with the projection piece 96, the carriers 11 are stopped at the position G by the engagement with the trigger 87. On the other hand, as the fingers 50 of the carriers 11 maintained at the lowered position turn the lever 66 so as to close the contacts of the limit switch 69 disposed at the position G by the action of the operating piece 65 of the lever 66, the solenoid 60 is energized by the closing motion of the contacts of the limit switch 69, thereby, the lever 56 is turned clockwise by the motion of the lever 58 connected to the plunger of the solenoid 60, consequently, the trap door 54 supported by the lever 56 is opened. As described above the finger 50 of the carrier 11 is maintained at the lowered position when the yarn end retrieving motion has failed consequently when the carriers supporting the failed cop arrive at the position G, the failed cops are discharged through the cut portion 53 of the magazine table 52. On the other hand, as the fingers 50 of the carrier 11 maintained at the elevated position does not actuate the limit switch 69, and the fingers 50 of the carrier 11 supporting the normal cop are maintained at the elevated position as described already, even when the carriers 11 supporting normal cops have already arrived at the position G, the trap door 54 is still maintained at its closed condition, consequently, the normal cops are not discharged through the cut portion 53 of the magazine table 52.

According to the above-mentioned selected operation to normal cops and failed cops at the position of G, the carriers 11 which have been carried from the positions G to I can be classified into two kinds of carriers, that is one of which is supporting normal cop and the other which is not supporting any cop.

When the cop carrier 11 which is supporting a normal cop arrives at the position I in FIG. 1, the cam 136 secured to the vertical shaft 120, which rotates once for each passage of the winding unit, actuates the limit switch 139 at a time just before the winding unit arrives in front of a cop supply conduit $i$ disposed at the position I, thereby, the solenoid 113 for actuating knot-tier 112 is energized, the cramp lever 114 is turned counterclockwise in FIG. 22 by the action of the solenoid 113 by way of the link 117 and lever 116 and rod 115, consequently a knotter bill of the knot-tier 112 is actuated by the motion of a knoter clutch, the yarn end of the package supported on the winding unit is united with the yarn end of the cop supported by the carrier 11 the cam 111 (referring to FIG. 1) acts on the roller 29 disposed on the carrier 11 in such a way that the roller 29 is pushed in the right hand direction in FIG. 18 while the above-mentioned knot tying motion is taking place. By the above-mentioned motion of the cam 111, the slide plate 25 supporting the roller 29 is displaced to the right side so as to open the cop holders 23 and 24. Thereby, when the cop held by the cop holders 23 and 24 is released and the winding unit arrives just in front of the cop supplying conduit $i$ the cam 137 rotating together with the cam supplying conduit actuates the limit switch 140 so as to excite the solenoid for operating the trap door 72, consequently, the trap door 72 is opened by the same manner of the opening of the trap door 54 and the normal cop is transferred from the top carrier 11 to the winding unit.

When the cop transferring motion to the winding unit is operating as mentioned above, the cam 138 mounted on the vertical shaft 120 succeedingly actuates the limit switch 141. When the solenoid 120 is energized by the operation of the limit switch 141, the trigger 88 is turned counterclockwise in FIG. 4 by the action of the solenoid 102, the lever 103 and link 104, the hook 88′ of the trigger 88 is receded from the position of the projection piece 96 of the cop carrier 11, consequently, the cop carrier 11 is carried to the position A in FIG. 1, by the rotation of the pulley 10.

The normally closed limit switch 107 disposed at the position H in FIG. 1 receives the action of the elevated finger 50 of the cop carrier 11 but does not receive any action of the finger 50 when the finger 50 is maintained at the lower position so as to detect the existence of cop supported by the carrier 11 when the carrier passes the position H. When the following carrier 11 supported a normal cop the limit switch 107 is actuated as the finger 50 turns to the elevated position at F position so as to open the contact of the limit switch 107, consequently, even if the limit switch 141 periodically closes its contact, the solenoid 102 is maintained in an unexcited condition, consequently, the trigger 88 is returned to its normally projected condition by spring force, the cop carrier 11 is stopped at the position I in FIG. 1 by the action of the hook 88′ of the trigger 88 and the knot-tying operation is provided to the stopped carrier 11 then after the completion of the knot tying operation the cop is transferred from the carrier 11 to the respective winding unit.

On the other hand, when a carrier 11, without cop arrives at the position H, as the finger 50 is maintained at the lower position, the finger 50 does not actuate the limit switch 107, consequently, the contact of the limit switch 107 is maintained in the closed condition when the contact of the limit switch 141 is closed by the action of the cam 138, the solenoid 102 is excited, the trigger 88 is turned counterclockwise, the hook 88′ of the trigger 88 can be maintained at the releasing position with respect to the projection piece 96 of the carrier 11. Consequently the carrier 11 without cop passes the position I and is displaced to the position A in FIG. 1 at a higher speed than that of the winding unit.

To increase the efficiency of supplying cops to the respective winding units and to avoid the transfer motion to the cop carriers disclosed failed cops, it is desirable to reserve a few cop transferring carriers at the position between J and I in FIG. 1. For this purpose, the normally opened limit switch 135, which excites the solenoid 133 by way of a delay circuit when there is no cop carrier at the position before the limit switch 135 for a predetermined time, it is disposed at the J position in FIG. 1. Consequently, when the number of reserve carriers becomes less than the predetermined number (in the present embodiment, the predetermined number is six), the solenoid 133 is excited and the clutch operating lever 131 is turned counterclockwise in FIG. 6, the pawl 132 is released from the cut portion 127′ of the clutch wheel 127, as to actuate the friction clutch comprising the clutch wheel 127 and the friction wheel 128 and the cork plate 129, the rotation of the vertical shaft 120 is transmitted to the vertical shaft 121 through the transmitting means comprising spur gears 125 and 126, and the above-mentioned friction clutch, the cams 142, 143, 144 and 145 start to rotate again and the contacts of the limit switches 146, 147, 148 and 149 are closed in sequence. By the above-mentioned motion, the yarn end retrieving operation is performed at the E position in FIG. 1, the discharging operation of the failed cops is performed at the G position, the respective carriers 11 are carried to the respective position while the triggers 81, 82, 83, 84, 85, 86 and 87 are returned to their normal position for a while, the operation for detecting the existence of the carriers 11 supporting normal cops or failed cops is carried out while the respective carriers are being carried from position E to G, the carriers 11 which have received various operations arrive at the J position in spite of whether the carriers 11 support cop or not, when the contact of the limit switch 135 is opened by the action of the carrier 11 which has arrived at the J position, the rotation of the cams 142, 143, 144 and 145 which are secured to the vertical shaft 121 are stopped, thereby, the above-mentioned operations are also stopped, the carriers 11 which have arrived at the intermediate positions between A, D and G in FIG. 1 are positioned at the respective positions A, B, C, D, E and G until the succeeding return motion of the triggers 81, 82, 83, 84, 85, 86 and 87, and succeeding cop supplying motion to the winding unit at the position I in FIG. 1. Several empty cop carriers are reserved at the positions from A to K in FIG. 1, while each finger 50 of the carriers 11 which have completed the cop transfer motion to the respective winding units is lowered at the position A in FIG. 1, consequently, the above-mentioned cycle of the motions are repeated.

Method and device for repeating yarn retrieving motion

As described in the above-mentioned embodiment, the carrier 11 supporting a failed cop discharges the failed cop at the position G and the discharged cops are again supplied to the rotary chute b until the yarn end retrieving motion of the respective cops is completed. However, according to our experience, it is quite difficult to complete the yarn end retrieving motion of the failed cops when it has gone through more than two yarn retrieving motions. Referring to FIGS. 24, 25A, 25B, 26A, 26B, 27A, 27B, 28A, 28B, 29A, 29B, 30A and 30B, the device shown in these drawings, are partly improved devices of the first embodiment of the present invention, thereby, only two cycles of above-mentioned yarn end retrieving motion can be provided to the failed cops.

When a carrier 201 having an upper finger 202 and a lower finger 203 arrives at the position A and moreover the lower finger 203 is maintained at the lower position, the contact of the limit switch 225 is closed, a solenoid 204 is excited and a plunger 205 is pulled, thereby the rotary chute is turned a quarter turn by way of the power transmitting means comprising a bell crank lever 206, pawl 207 connected to the bell crank lever 206 by pin and a ratchet wheel 208 having four grooves disposed at the circumference of the wheel with same intervals, thereby, the cop receivers 209 of the rotary chute are turned a quarter turn around the shaft of the rotary chute consequently, the cop supported by the cop receiver 209 is supplied to the carrier 201 through the chute 210. On the other hand, when the lower finger 203 of the carrier 201 is maintained at the upper position, the limit switch 225 is not actuated, consequently, there is no cop supplying motion to the carrier 201.

The suction device, searching device for searching yarn end from the cop, beater etc. having the same constructions and functions as those of the first embodiment are disposed to the apparatus of the second embodiment. The detecting device disposed to E' position in FIG. 24 ascertains whether the yarn end-retrieving motion is completed or not in the same manner of the first embodiment and when the yarn end retrieving device detects the existence of a normal cop supported by the carrier 201 a solenoid 211 is excited so as to pull a plate 211' which operates a lever 212 of a limit switch 224 (referring to FIG. 27A), thereby the contact of the limit switch 224 is closed, a solenoid 223 is excited, thereby a cam 213 for displacing the upper finger 202 is turned to the upward direction, and consequently, when the carrier arrives at F'' position, the upper finger 202 is lifted upward by the contact with the cam 213.

At G' position, the limit switches 214 and 215 disposed at the G' position close their contacts only in case the upper finger 202 of the carrier 201 is maintained at the lower position and the lower finger 203 is maintained at its upper position. The two circuits of the limit switches 214 and 215 are connected in series with the circuit of the solenoid 226 for operating the opening and closing of the trap door which has the same construction as that of the first embodiment. Therefore, the solenoid 226 for opening and closing the trap door is not excited except when the fingers 202 and 203 of the carriers 201 are maintained at the lowered and elevated position, respectively.

A limit switch 227 is disposed at H' position just before the position I' where normal cops are transferred to the respective winding units and the limit switch 227 excites the solenoid (not shown) to open the trap door for supplying the normal cops to the respective winding units only when the upper finger 202 is maintained at the elevated position.

At J' position, a limit switch 228 and a solenoid (not shown) are disposed in order to excite the solenoid when the lower finger 203 is maintained at the elevated position. When the carrier 201 having the lowered upper finger 202 and elevated lower finger 203 arrives at the J' position, the cam (not shown) for lifting the upper finger 202 turns upward.

Figure 28A:
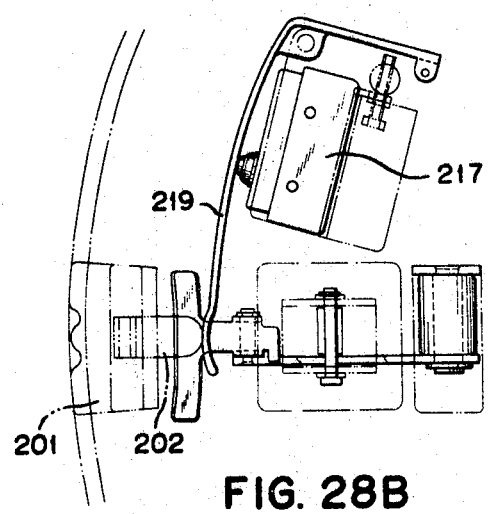
FIGS. 28A and 28B are a plan view and side view showing an electrical actuating means for turning lower finger according to the position of upper finger.
Figure 28B:
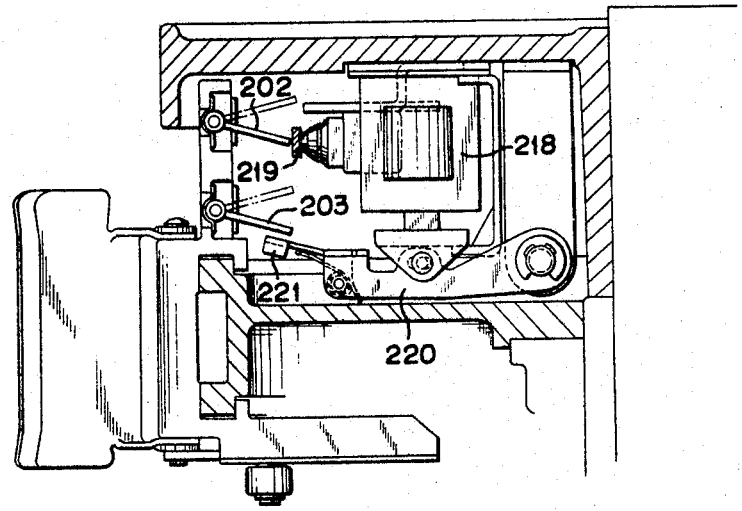
Figures 29A, 29B:
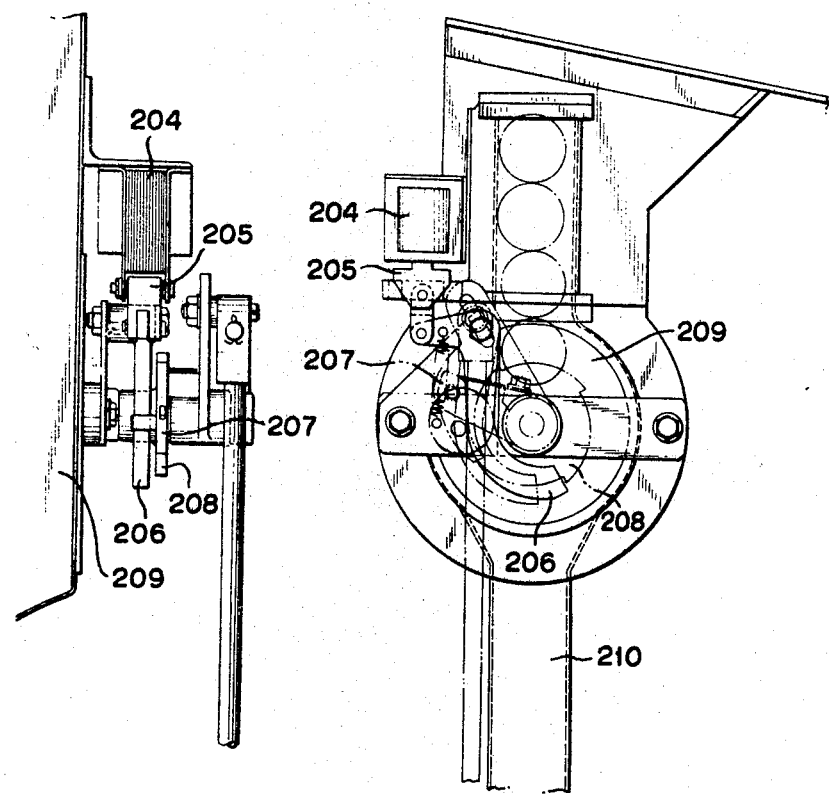
FIGS. 29A and 29B are side and front view of rotary chute, respectively.
Figure 30A:
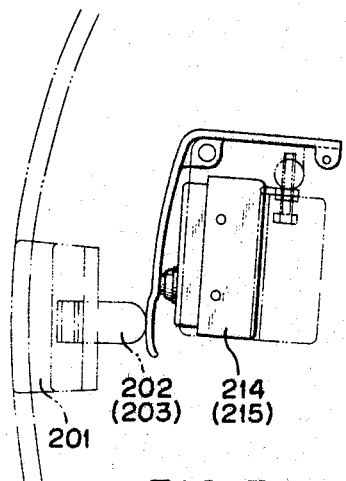
FIGS. 30A and 30B are plan and side views of an electrical actuating means which can be excited according to the position of lower end upper fingers.
Figure 30B:
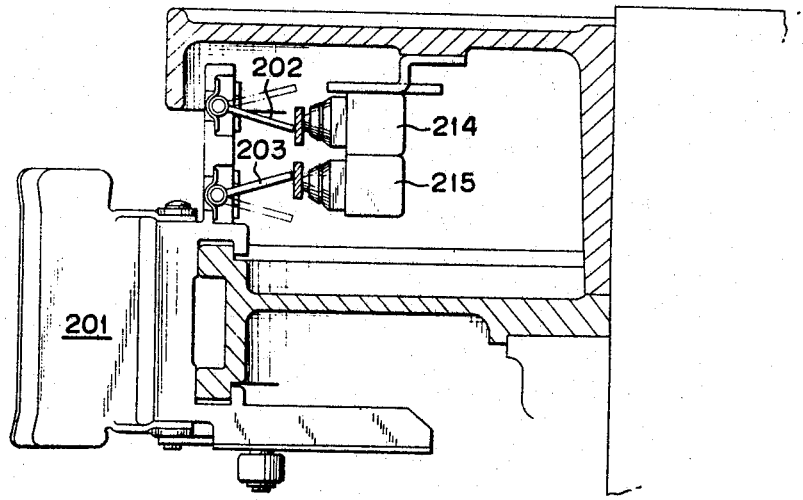

A cam 216 for turning the lower finger 203 downward is disposed on a position K' as shown in FIGS. 24, 25A and 25B. And a limit switch 217 and a solenoid 218 are disposed at a position L as shown in FIGS. 28A and 28B. The limit switch 217 and solenoid 218 actuate the upward turning motion of the lower finger 202 maintained at the lower position only when the upper finger 202 is maintained at the lower position. Consequently, when the carrier 201 having the upper finger 202 maintained at its elevated position and the lower finger 203 maintained at its lower position arrives at the position L', the top end of the upper finger 202 pushes a contact operating lever 219 of the limit switch 217, the contact of the limit switch 217 is closed, thereby, the solenoid 218 is excited and the lower finger 203 is turned upward by the turning motion of a lever 220.

A cam 222 for turning the upper finger 202 downward is disposed at a position M', thereby, when a carrier 201 having the upper finger 202 maintained at its elevated position arrives at the position the cam 222 turns the elevated upper finger downward.

Table 1 shows the relation between the positions of the fingers 202 and 203 of the carrier position of the carrier 201, condition of cops supported by the carrier 201 and their related operations.

TABLE 1

| | Limit switch or cam | Cycle | Condition of fingers Upper-Lower | Condition of cop | Condition of carrier | Operations |
|---|---|---|---|---|---|---|
| Position of carrier: | | | | | | |
| A' | | 1 | − | rec | rec | Receiving of cop by carrier. |
| B' | | 1 | − | | sup | Taking off the tail end of yarn of the carrying cop. |
| C' | | 1 | − | | sup | Searching of back winding. |
| D' | | 1 | − | − | sup | Beating action back wind and retrieving yarn. |
| E' | Limit switch 224 | 1 | + − | * | sup | Turns the up-finger. |
| | | | − − | # | sup | |

TABLE 1—Continued

| Limit switch or cam | Cycle | Condition of fingers Upper-Lower | Condition of cop | Condition of carrier | Operations |
|---|---|---|---|---|---|
| Position of carrier: |  |  |  |  |  |
| F'........................... | 1 | + — | * | sup..... |  |
|  |  | — — | # | sup..... |  |
| G'............ Limit switch 226.... | 1 | + — | * | sup..... |  |
|  |  | — — | # | sup..... |  |
| H'............ Limit switch 227.... | 1 | + — | * | sup..... |  |
|  |  | — — | # | sup..... |  |
| I'........................... | 1 | + — |  | emp.... | Transfers cop winding unit. |
|  |  | — — | # | sup..... |  |
| J'............ Limit switch 228.... | 1 | + — |  | emp.... |  |
|  |  | — — | # | sup..... |  |
| K'............ Cam 216.......... | 1 | + — |  | emp.... |  |
|  |  | — — | # | sup..... |  |
| L'............ Limit switch 217.... | 1 | + — |  | emp.... |  |
|  |  | — + | # | sup..... | Turns the lower finger. |
| M'............ Cam 222.......... | 1 | — — |  | emp.... | Turns the upper finger. |
|  |  | — — | # | sup..... |  |
| A'........................... | 2 | + + | # | sup..... | Does not receive new cop. |
| B'........................... | 2 | — + | # | sup..... | Same action as cycle 1. |
| C'........................... | 2 | — + | # | sup..... | Same action as cycle 1. |
| D'........................... | 2 | — + | # | sup..... | Same action as cycle 1. |
| E'............ Limit switch 224.... | 2 | + + | * | sup..... | Turns the upper fingers. |
|  |  | — + | # | sup..... |  |
| F'........................... | 2 | + + | * | sup..... |  |
|  |  | — + | # | sup..... |  |
| G'............ Limit switch 226.... | 2 | + + | * | dup..... |  |
|  |  | — + | # | dis...... | Discharges failed cop of machine. |
| H'............ Limit switch 227.... | 2 | + + | * | sup..... |  |
|  |  | — + |  | emp.... |  |
| I'........................... | 2 | + + |  | emp.... | Transfers cop to winding unit. |
|  |  | — + |  | emp.... |  |
| J'............ Limit switch 228.... | 2 | + + |  | emp.... |  |
|  |  | + + |  | emp.... | Turns the upper finger. |
| K'............ Cam 216.......... | 2 | + — |  | emp.... | Turns the lower finger. |
|  |  |  |  | emp.... | Turns the lower finger. |
| L'............ Limit switch 217.... | 2 | + — |  | emp.... |  |
|  |  | + — |  | emp.... |  |
| M'............ Cam 222.......... | 2 | — — |  | emp.... | Turns the upper finger. |
|  |  | — — |  | emp.... | Turns the upper finger. |

NOTE.—1. Cycle refers to the first and second operation. 2. In the column "condition of fingers", +refers to normal cop which has completed the yarn end retrieving motion; — refers to failed cop which has failed yarn end retrieving motion. 3. In the column "Condition of Cop", * refers to normal cop and # to failed cops respectively. 4. In the column "Condition of Carrier", "rec" means receiving cop, "dis" means discharging cop, "sup" means supporting cop, "emp" means empty.

As mentioned above, in the embodiment of the present invention, the cops which have failed in the first operation are given another chance for retrieving yarn end in the second operation and cops which fail twice are discharged from the carriers 201 consequently, the supplying efficiency of cops to the respective winding units is improved and moreover it is possible to prevent damage of the yarn to the failed cops by repeating the operation of yarn retrieving.

While a preferred embodiment of the invention has been shown in the drawings and described in detail above, it should be understood that various modifications may be had which would be equally within the spirit and scope of the invention, and that the true measure of the invention is as defined in the hereinafter set forth claims.

We claim:
1. A method of automatically supplying fresh cops to traveling winding units of an automatic winder comprising, providing fresh cops of a yarn at a given position, transporting the fresh cops in a given sequence along a predetermined path of travel and while transporting said cops along said path retrieving on each cop a tail free end of the yarn thereof, automatically detecting whether the free tail end of the yarn of the individual cops is in a retrieved condition and detecting a failure to retrieve said free tail end of the yarn of individual cops, discharging in succession from said path of travel cops in which the free tail end of yarn thereof has not been retrieved, and continuing within the sequence transporting along said path of travel as normal cops those cops in which said free tail end of yarn has been retrieved, automatically transferring at a designated point of said path of travel the normal cops from said path of travel to said winding units of said automatic winder.

2. A method of automatically supplying fresh cops to travelling winding units according to claim 1, including continuing to supplying fresh cops at said given position for repetitively transporting fresh cops, retrieving the free end of yarn thereof, detecting the retrieved condition of said tail end yarn of the individual cops and the failure to retrieve said tail end of the individual cops and said transferring of normal cops at said designated point.

3. A method for supplying cops automatically to travelling winding units of an automatic winder from a fresh cop reserve device comprising, transferring fresh cops from said fresh cop reserve device into individual cop-carriers at a waiting position; transporting said cop-carriers each carrying a single fresh cop along a closed path in a given sequence; retrieving the tail end of yarn of each cop while transporting said cop-carriers along said closed path; detecting whether the retrieving of said yarn of tail end has been accomplished or not on each cop while said cop-carriers are transported; automatically discharging from said path as failed cops in which retrieving of said yarn tail end has failed; continuing transporting said cop-carriers carrying as normal cops those cops in which said retrieving of said yarn end has been accomplished and cop-carriers from which failed cops have been discharged to a cop-transfer station disposed to in said closed path and corresponding to a predetermined position relative to which said travelling winding units pass; transferring the normal cops from said cop-carriers onto said traveling winding units while said cop-carriers carrying normal cops are at said transferring station; allowing free passage through said cop-transfer station of said cop-carriers from which failed cops have been discharged, and transporting both types of said cop-carriers to said waiting position from which transfer of said normal cops has been completed or from which failed cops were discharged ahead of said cop-transfer station in the same order in said sequence.

4. A method of automatically supplying fresh cops to travelling winding units according to claim 3, wherein said cop-carriers from which cops are discharged are transported through said cop-transfer station without stopping at said cop-transfer station.

5. A method of automatically supplying fresh cops to travelling winding units according to claim 3, including stopping intermittently said cop-carriers along said path of travel while retrieving tail end of yarn from cops, discharging of said failed cops and transferring normal cops to said travelling units and transferring of fresh cops to said cop-carriers.

6. A method for supplying cops automatically to travelling winding units of an automatic winder according to claim 5, further including retrieving only once again the free tail end of yarn of failed cops which were not discharged from the cop-carriers at the first transportation of said cop-carriers along said closed path.

7. Apparatus for supplying cops automatically to travelling winding units of an automatic winder from a fresh cop reserve device comprising, cop-carrier means having a plurality of cop-carriers to receive fresh cops individually and to transport said cop-carriers along a closed path of travel individually in sequence, means to retrieve a free tail end of yarn of the individual cop while transported along said path, detection means to detect automatically whether the free tail end of the individual yarns of the cops have been retrieved and to detect a failure of the retrieval of said yarn tail end of cops in which retrieval of said yarn tail ends has failed, means automatically operatable responsive to said detector means causing discharge of cops from said cop-carriers in which retrieval of said free tail end of yarn thereof has failed, and means rendering transfer means on effective to automatically transfer to said units of said winder the normal cops in which retrieval of said yarn tail end thereof has been detected.

8. Apparatus for supplying cops automatically to travelling winding units of an automatic winder according to claim 7, including means for passing through said transfer station without stopping cop-carriers from which cops have been discharged.

9. Apparatus for supplying cops automatically to travelling winding units of an automatic winder according to claim 7, including means to transfer cops to empty cop-carriers, and including stop means for stopping said cop-carriers at predetermined positions on said closed path for operating each of said means for retrieving said yarn tail end, said means for discharging failed cops, said means for transferring normal cops from said cop-carriers to said winding units, and said means for transferring fresh cops to empty cop-carriers for selected periods of time respectively.

10. Apparatus for supplying cops automatically to travelling winding units of an automatic winder according to claim 7, wherein each cop-carrier is provided with a single finger turnably mounted on said cop-carrier and operatable to two positions for actuating alternatively said means for causing discharging of said cops and said means transferring cops to said winding units.

11. Apparatus for supplying cops automatically to travelling winding units of an automatic winder according to claim 7, wherein said cop-carrier means transporting said cop-carriers along said closed path comprises a rotating driven element provided with each cop-carrier thereon slidably mounted on said rotating element to allow it when required to slide relative to said element and normally rotating with said rotating element with negligible slip, means driving said rotating element a predetermined turns of rotation relative to passage of said winding units of said automatic winder.

12. Apparatus for supplying cops automatically to travelling winding units of an automatic winder according to claim 11, including means for discharging cops from cop-carriers out of said apparatus comprising a trap door and an electrical mechanism to open said trap door permitting passing the discharged cops, and a limit switch actuated by the finger of each cop-carrier disposed adjacent said closed path of travel of said cop-carriers energizing said electrical mechanism when said finger positioned at a position for discharging cops actuates said limit switch.

13. Apparatus for supplying cops automatically to travelling winding units of an automatic winder according to claim 10, wherein said transfer means for transferring cops from said cop-carriers to said winding units of said winder comprises a hinged trap door and electrical mechanism to open said trap door for permitting passing said normal cops, a limit switch actuated by the finger of each cop-carrier disposed adjacent said closed path of travel of said cop-carriers energized said electrical mechanism when said finger positioned at a position for supplying normal cops to winding units actuated said limit switch, stop means for stopping cop-carriers carrying normal cops to effect said transfer, and said stop means comprising a trigger mechanism and electrical mechanism.

14. Apparatus for supplying cops automatically to travelling winding units of an automatic winder according to claim 7, including means to transfer fresh cops to said cop-carriers and including means for reserving cop-carriers carrying normal cops at a portion of said closed path of travel just before said transfer is effected, and means for reserving cop-carriers without cops at a portion just before a working position of said means to transfer fresh cops to said cop-carriers.

15. Apparatus for supplying cops automatically to travelling winding units of an automatic winder according to claim 13, wherein said stop means trigger mechanism comprises a plurality of triggers each having a hooked portion pivotably disposed under said rotating element, an electrical actuating means for effecting turning of said triggers so as to engage said hook portion of each trigger with each cop-carrier when said hook portion of said triggers are projected beyond and closed path of travel, means connecting said triggers with each other by link motion, and said hooks of said triggers positioned at least at a working position at which discharging of cops is effected.

16. Apparatus for supplying cops automatically to travelling winding units of an automatic winder according to claim 14, wherein said means for reserving cop-carriers carrying a normal cop comprises stop means for stopping cop-carriers for a predetermined period at a position prior to said transfer, electrical mechanism for actuating said stop means, said electrical mechanism including a control switch disposed to adjacent said closed path of travel to detect the absence of cop-carriers at the last mentioned position.

17. Apparatus for supplying cops automatically to travelling winding units of an automatic winder from a fresh cop reserving device comprising, in combination, cop-carriers for carrying said fresh cops; means for transferring fresh cops to cop-carriers from said cop reserve device one by one; means for transporting said cop-carriers along a closed path of travel; means for retrieving yarn tail ends of cops carried by said cop-carriers at a predetermined position on said closed path of travel; means for classifying cop-carriers into three types, cop-carriers carrying normal cops in which the yarn tail ends have been retrieved, cop-carriers carrying cops in which retrieval of the tail end failed once and cop-carriers carrying cops in which tail end retrieval failed twice; means for discharging cops in which retrieval failed twice from the cop-carriers carrying cops in which retrieval failed twice; means for transferring normal cops from said cop-carriers supporting said normal cop to winding units at a transfer station on said closed path of travel and at a predetermined position relative to which said travelling winding units pass; means transporting cop-carriers to a working position of said means for transferring fresh cops to cop-carriers without a cop, and trap doors for discharging cops from said cop-carriers.

18. Apparatus for supplying cops automatically to travelling winding units of an automatic winder according to claim 17, wherein said means for classifying cop-carriers into said three types comprises fingers turnably mounted on each of said cop-carriers, detection means detecting of failure of the yarn tail end retrieve motion by said means for retrieving yarn tail ends from cops travelling along said closed path of travel; electrical energizing cam means for turning said fingers for detecting failure of said yarn tail end retrieve; a limit switch disposed adjacent said closed path of travel actuatable when cop-carriers carrying twice failed cop pass said switch; an electrical mechanism under control of said switch for opening a trap door for permitting discharge of twice failed cops.

19. Apparatus for supplying cops automatically to travelling winding units of an automatic winder according to claim 18, wherein said means for transferring normal cops from said cop-carriers to winding units comprises electrical mechanism opening a trap door a limit switch connected to said electrical mechanism disposed adjacent to said closed path of travel actuated by said means classifying said cop-carriers only relative to cop-carriers in which yarn tail end retrieval is completed.

References Cited

UNITED STATES PATENTS

| | | | |
|---|---|---|---|
| 2,675,971 | 4/1954 | Abbott | 242—35.6 |
| 3,154,904 | 11/1964 | Furst | 242—35.5 X |
| 3,224,694 | 12/1965 | Isao Oishi | 242—35.5 |
| 3,329,362 | 7/1967 | Kieronski | 242—35.6 |

STANLEY N. GILREATH, Primary Examiner